(12) United States Patent
Ou

(10) Patent No.: US 11,624,349 B2
(45) Date of Patent: *Apr. 11, 2023

(54) METHOD AND APPARATUS FOR CONTROLLING NOISE OF WIND TURBINE

(71) Applicant: BEIJING GOLDWIND SCIENCE & CREATION WINDPOWER EQUIPMENT CO., LTD., Beijing (CN)

(72) Inventor: Fashun Ou, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 411 days.

This patent is subject to a terminal disclaimer.

(21) Appl. No.: 16/476,692

(22) PCT Filed: Sep. 29, 2018

(86) PCT No.: PCT/CN2018/108656
§ 371 (c)(1),
(2) Date: Jul. 9, 2019

(87) PCT Pub. No.: WO2019/218574
PCT Pub. Date: Nov. 21, 2019

(65) Prior Publication Data
US 2021/0332792 A1    Oct. 28, 2021

(30) Foreign Application Priority Data

May 18, 2018    (CN) .......................... 201810480707.5

(51) Int. Cl.
*F03D 9/00*     (2016.01)
*H02P 9/04*     (2006.01)
*F03D 7/02*     (2006.01)

(52) U.S. Cl.
CPC .......... *F03D 7/0296* (2013.01); *F03D 7/028* (2013.01); *F03D 7/0276* (2013.01);
(Continued)

(58) Field of Classification Search
CPC ...... F03D 7/0224; F03D 7/0276; F03D 7/028; F03D 7/0296; F03D 7/048; F05B 2260/96;
(Continued)

(56) References Cited

U.S. PATENT DOCUMENTS 6,688,841 B1 * 2/2004 Wobben ................ F03D 7/048
                                                              415/1
7,902,689 B2 * 3/2011 Kinzie .................. F03D 7/028
                                                              290/55
(Continued)

FOREIGN PATENT DOCUMENTS

CN    101907062 A    12/2010
CN    102562447 A    7/2012
(Continued)

OTHER PUBLICATIONS

European Search Report Appln 18893344.4 dated Apr. 20, 2020.
(Continued)

*Primary Examiner* — Tulsidas C Patel
*Assistant Examiner* — Thomas K Quigley

(57) ABSTRACT

A method and an apparatus for controlling noise of a wind turbine. The method includes: determining a noise-influencing sector of the wind turbine based on a position of the wind turbine and a position of a noise-influencing site; acquiring a current wind direction; determining whether the wind turbine under the current wind direction operates in the noise-influencing sector; and limiting output power of the wind turbine, and increasing, after the wind turbine goes out from the noise-influencing sector and the output power
(Continued)

reaches a rated power, the output power, in a case that the determination is positive.

18 Claims, 5 Drawing Sheets

(52) U.S. Cl.
CPC ... *F05B 2270/1033* (2013.01); *F05B 2270/32* (2013.01); *F05B 2270/321* (2013.01); *F05B 2270/327* (2013.01); *F05B 2270/333* (2013.01); *F05B 2270/335* (2013.01)

(58) Field of Classification Search
CPC ........ F05B 2270/101; F05B 2270/1033; F05B 2270/321; F05B 2270/327; F05B 2270/328; F05B 2270/333; F05B 2270/335
See application file for complete search history.

(56) References Cited

U.S. PATENT DOCUMENTS

| | | | | |
|---|---|---|---|---|
| 8,100,647 | B2* | 1/2012 | Godsk | F03D 7/042 416/1 |
| 8,128,361 | B2* | 3/2012 | Dawson | F03D 7/042 416/1 |
| 8,215,907 | B2* | 7/2012 | Kooijman | F03D 7/0296 416/1 |
| 8,426,994 | B2* | 4/2013 | Nielsen | F03D 7/048 290/44 |
| 10,697,431 | B2* | 6/2020 | Hammerum | F03D 7/0296 |
| 2009/0295165 | A1* | 12/2009 | Giguere | F03D 13/00 290/55 |
| 2010/0074748 | A1* | 3/2010 | Godsk | F03D 7/024 416/1 |
| 2010/0133818 | A1* | 6/2010 | Kinzie | F03D 7/0296 290/44 |
| 2010/0143117 | A1 | 6/2010 | Xiong | |
| 2010/0143119 | A1* | 6/2010 | Kooijman | F03D 7/0212 416/1 |
| 2010/0158687 | A1* | 6/2010 | Dawson | F03D 7/0292 416/31 |
| 2011/0175356 | A1* | 7/2011 | Nielsen | F03D 7/048 290/44 |
| 2011/0223006 | A1* | 9/2011 | Loh | F03D 7/0224 415/118 |
| 2012/0025530 | A1* | 2/2012 | Kinzie | F03D 7/048 290/44 |
| 2012/0027590 | A1 | 2/2012 | Bonnet | |
| 2012/0027591 | A1* | 2/2012 | Kinzie | F03D 7/0296 416/1 |
| 2012/0139254 | A1* | 6/2012 | Attia | F03D 13/20 290/55 |
| 2013/0140818 | A1* | 6/2013 | Matesanz Gil | F03D 7/0296 290/44 |
| 2013/0209220 | A1* | 8/2013 | Nielsen | F03D 7/0296 415/1 |
| 2014/0377065 | A1* | 12/2014 | Matesanz | F03D 7/0296 416/1 |
| 2015/0071778 | A1 | 3/2015 | Delport et al. | |
| 2016/0032892 | A1* | 2/2016 | Herrig | F03D 7/0296 416/1 |
| 2016/0032893 | A1* | 2/2016 | Herrig | F03D 7/048 290/44 |
| 2016/0032894 | A1* | 2/2016 | Ambekar | F03D 7/048 416/1 |
| 2016/0341180 | A1* | 11/2016 | Lee | F03D 7/0224 |
| 2017/0356421 | A1* | 12/2017 | Petitjean | G05B 19/042 |
| 2019/0040843 | A1* | 2/2019 | Gray | F03D 7/048 |
| 2019/0154000 | A1* | 5/2019 | Hammerum | F03D 7/0296 |
| 2019/0203694 | A1* | 7/2019 | Gupta | F03D 7/0276 |
| 2020/0362818 | A1* | 11/2020 | Barlas | F03D 7/0296 |

FOREIGN PATENT DOCUMENTS

| | | |
|---|---|---|
| CN | 102808725 A | 12/2012 |
| CN | 103244351 A | 8/2013 |
| DE | 19926553 A | 12/2000 |
| EP | 2131037 A | 12/2009 |
| EP | 3073108 A | 9/2016 |
| JP | 4637419 B2 | 2/2011 |
| KR | 20160045295 A | 4/2016 |
| WO | 2010061255 A2 | 6/2010 |
| WO | WO-2017000956 A1 * | 1/2017 ........... F03D 7/0296 |

OTHER PUBLICATIONS

First Chinese Office Office Appln 201810480707.5 Issued Apr. 13, 2020.
International Search Report dated Jan. 30, 2019; PCT/CN2018/108656.
Tom Evans, et al; "Influence of wind direction on noise emission and propagation from wind turbines", Proceedings of Acoustics 2012—Fremantle, Nov. 21-23, 2012; 5 pages.
The First Australian Office Action dated May 22, 2020; Appln. No. 2018386360.

* cited by examiner

METHOD AND APPARATUS FOR CONTROLLING NOISE OF WIND TURBINE

CROSS-REFERENCE TO RELATED APPLICATIONS

This application is the national phase of International Application No. PCT/CN2018108656, titled "METHOD AND APPARATUS FOR CONTROLLING NOISE OF WIND TURBINE", filed on Sep. 29, 2018, which claims priority to Chinese Patent Application No. 201810480707.5, titled "METHOD AND APPARATUS FOR CONTROLLING NOISE OF WIND TURBINE", filed on May 18, 2018 with the National Intellectual Property Administration of People's Republic of China, which is incorporated herein by reference in its entirety.

FIELD

The present disclosure relates generally to the technical field of wind power generation, and in particular, to a method and an apparatus for controlling noise of a wind turbine.

BACKGROUND

In recent years, construction of wind farms is getting more and more close to residential areas with development of wind power industry. As a result, an impact of noise generated in operation of a wind turbine on residents cannot be ignored.

There are two main kinds of the noise generated in operation of wind turbine. One is mechanical noise generated in the operation of wind turbine, for example, yaw noise and cooling fan noise of a converter. The other is aerodynamic noise of blades of the wind turbine, that is, noise due to high-speed airflow around the blades in rotation. To deal with the above two kinds of noise generated by the wind turbine that has been built, a saw-tooth tailing edge may be installed on the blades from a structural perspective, or output power of the wind turbine may be reduced from a control perspective.

The conventional method for controlling noise from the control perspective is inflexible, apt to result in a great loss in power generation, and hard to meet requirements on various customizations.

SUMMARY

A method for controlling noise of a wind turbine is provided according to one aspect of an embodiment of the present disclosure. The method may include: determining a noise-influencing sector of the wind turbine based on a position of the wind turbine and a position of a noise-influencing site; acquiring a current wind direction; determining whether the wind turbine under the current wind direction operates in the noise-influencing sector; limiting output power of the wind turbine, and increasing, after the wind turbine goes out from the noise-influencing sector and the output power reaches a rated power, the output power, in a case that the determination is positive; and continuing to acquire the current wind direction again, in a case that the determination is negative.

An apparatus for controlling noise of a wind turbine is provided according to another aspect of an embodiment of the present disclosure. The apparatus may include: a sector determination module, configured to determine a noise-influencing sector of the wind turbine based on a position of the wind turbine and a position of a noise-influencing site; a first acquisition module, configured to acquire a current wind direction; a sector judgment module, configured to determine whether the wind turbine under the current wind direction operates in the noise-influencing sector; and a power regulation module, configured to limit output power of the wind turbine, and increase, after the wind turbine goes out from the noise-influencing sector and the output power reaches a rated power, the output power, in a case that the wind turbine operates in the noise-influencing sector; where the first acquisition module acquires the current wind direction again, in a case that the wind turbine does not operate in the noise-influencing sector.

A computer-readable storage medium storing a computer program is provided according to another aspect of an embodiment of the present disclosure. The computer program when executed by a processor performs the aforementioned method for controlling noise of the wind turbine.

A device for controlling a wind turbine is provided according to another aspect of an embodiment of the present disclosure. The device includes a processor, and a memory storing a computer program, where the computer program when executed by the processor performs the aforementioned method for controlling noise of the wind turbine.

Based on the method and the apparatus for controlling noise of the wind turbine according to the embodiments of the present disclosure, an operation mode of the wind turbine can be reasonably switched by delimiting the noise-influencing sector of the wind turbine. Thereby, the wind turbine is controlled to meet the requirement on the noise while timely compensating a loss in power generation, and requirements on various customizations are met.

BRIEF DESCRIPTION OF THE DRAWINGS

Hereinafter drawings of embodiments are illustratively shown for detailed description. The aforementioned and other objectives, features and advantages of the embodiments of the present disclosure would be clear and characterized as follows.

DETAILED DESCRIPTION OF EMBODIMENTS

Hereinafter different exemplary embodiments are described more thoroughly with reference to the drawings.

Figure 1:
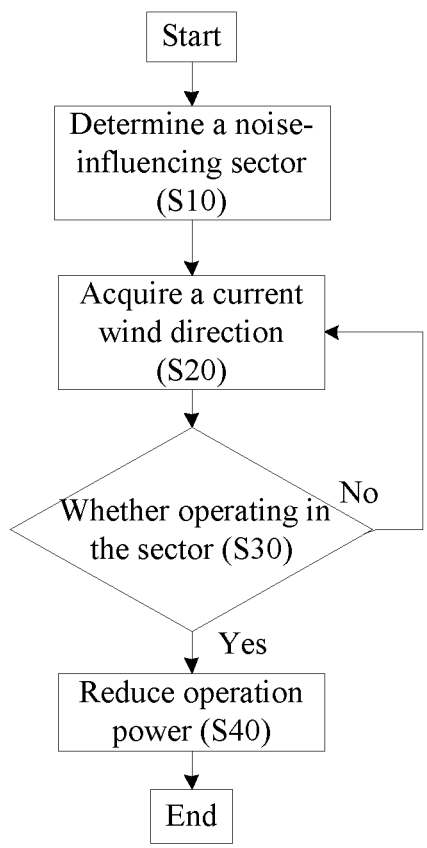
FIG. 1 is a flowchart of a method for controlling noise of a wind turbine according to an embodiment of the present disclosure.

FIG. 1 is a flowchart of a method for controlling noise of a wind turbine according to an embodiment of the present disclosure.

Reference is made to FIG. 1. In step S10, a noise-influencing sector of the wind turbine may be determined based on a position of the wind turbine and a position of a noise-influencing site.

The noise-influencing site refers to a referential site (for example, a settlement) affected by the noise of the wind turbine. Hereinafter determination of the noise-influencing sector is described in detail with reference to FIG. 2.

Figure 2:
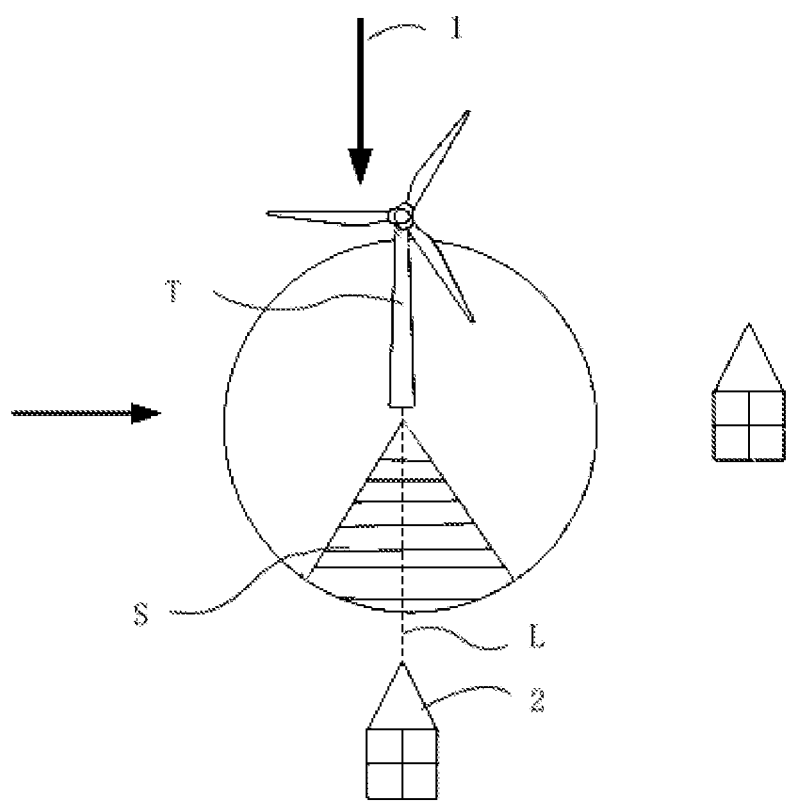
FIG. 2 is a schematic diagram for determining a noise-influencing sector of a wind turbine based on a position of the wind turbine and a position of a noise-influencing site according to an embodiment of the present disclosure.

FIG. 2 is a schematic diagram for determining a noise-influencing sector of a wind turbine based on a position of the wind turbine and a position of the noise-influencing site according to an embodiment of the present disclosure.

Based on a noise propagation theory of a wind turbine (hereinafter may be abbreviated as a turbine), a referential site in an upwind direction of the wind turbine is subjected to a minimum influence of noise, and a referential site in a downwind direction of the wind turbine is subjected to a maximum influence of noise. For example, as shown in FIG. 2, the settlement 2 is greatly affected by the noise of a turbine T under the current wind direction (as indicated by 1 in FIG. 2), in a case that the residential point 2 is located within the downwind direction of the turbine (namely, the wind goes in a direction from the turbine T to the settlement 2). Therefore, for a wind turbine and a noise-influencing site that have been determined, the noise-influencing sector for the turbine on the noise-influencing site may be determined based on the position of the turbine and the position of the noise-influencing site.

In some embodiments, the noise-influencing sector may be a sector region. A vertex of the sector region is the position of the wind turbine. A central angle of the sector region has a predetermined angle, and is formed with an angular bisector in a direction from the wind turbine to the noise-influencing site. Namely, the position of the wind turbine is an end point of the angular bisector, which is a ray, and a direction of the ray is along a connection line starting from the position of the wind turbine to the noise-influencing site.

For example, reference is made to FIG. 2. A sector region S may be formed by taking the position of the turbine T as the vertex, a connection line to the residential point 2 (as line L shown in FIG. 2) as the angular bisector, and a predetermined angle as the central angle. The formed sector region S is the noise-influencing sector. For example, the predetermined angle may be 60° or 90°, but is not limited thereto. Therefore, for different wind directions, in a case that the turbine operates within a range of the determined noise-influencing sector (that is, a region in the downwind direction of the turbine is included in the noise-influencing sector), noise of the turbine has a greater influence on a referential site in the range of the noise-influencing sector than the one on a referential site out of the range of the noise-influencing sector.

Reference is made to FIG. 1 again. In step S20, the current wind direction may be acquired.

In some embodiments, a referential direction of the turbine may be acquired via a satellite positioning-and-orientation system installed on the wind turbine, and the current wind direction may be acquired in real time via the satellite positioning-and-orientation system and a yaw system of the turbine.

For example, the referential direction of the turbine (such as due north) may be acquired via the satellite positioning-and-orientation system, and the current wind direction may be acquired via the yaw system of the turbine based on the acquired referential direction. It should be noted that the above is an example, and embodiments of the present disclosure are not limited thereto.

In step S30, it may be determined whether the wind turbine under the current wind direction operates in the noise-influencing sector. For example, as described above, it may be determined whether the downwind region of the turbine is included in the determined noise-influencing sector under the current wind direction.

In a case that it is determined in the step S30 that the wind turbine operates in the noise-influencing sector, output power of the wind turbine may be limited in step S40. After the wind turbine operates goes out from the noise-influencing sector (that is, the downwind region of the turbine is not included in the noise-influencing sector), the output power of the wind turbine is increased after reaching a rated power.

In a case that it is determined in the step S30 that the wind turbine does not operate in the noise-influencing sector, the method returns to step S20 and continues to acquire the current wind direction.

In some embodiments, that the output power is limited may include following steps. A requirement on noise control at the noise-influencing site is acquired, and the requirement on noise control includes a level of a sound pressure at the noise-influencing site. The wind turbine is operated in a power-limited mode corresponding to the requirement on noise control, so as to control the noise.

Specifically, aerodynamic noise of the wind turbine in operation may be represented by a level $L_\omega$, of sound power (in decibels (dB)). For a specific noise-influencing site, a noise level sensed at the noise-influencing site due to the aerodynamic noise of the turbine may be represented by the level $L_p$ (in decibels (dB)) of the sound pressure. For example, the maximum level of the bearable sound pressure at the noise-influencing site can be obtained by acquiring the requirement on noise control at the noise-influencing site.

Magnitude of the level of the sound pressure is related to a distance to a sound source (for example, the turbine). Generally, for the turbine and the noise-influencing site with determined positions while neglecting complex terrain factors, the higher the level of the sound power of the turbine is, the higher the level of the sound pressure at the noise-influencing site is. Therefore, the level of the sound power of the turbine may be reduced by operating the turbine in the power-limited mode, and thereby the level of the sound pressure level at the noise-influencing site is reduced.

In some embodiments, in a case that the wind turbine operates in the power-limited mode, an impeller speed of the wind turbine may be limited and/or a minimum pitch angle may be increased, so that the measured level of the sound pressure at the noise-influencing site is less than or equal to a required level of the sound pressure. Those skilled in the art should appreciate that a specific power-limited mode of the present disclosure is not limited to the aforementioned manner that is determined according to the requirement on noise control. For example, the power-limited mode of the turbine may be set in advance.

In some embodiments, a degree of reducing the impeller speed and/or increasing the minimum pitch angle may be determined based on a distance between the noise-influencing site and the turbine. Namely, the closer the noise-influencing site is to the turbine, the greater the impeller speed and the minimum pitch angle are adjusted.

After adjusting the impeller speed and/or the minimum pitch angel, the level of the sound pressure at the noise-influencing site may be measured, so as to determine whether a measured level of the sound pressure is less than or equal to the required level of the sound pressure at the noise-influencing site. In case of a positive determination, the turbine operates at the adjusted impeller speed and the adjusted minimum pitch angle, so as to ensure that the level of the sound pressure at the noise-influencing site in the noise-influencing sector meets the requirement.

In a case that the measured level of the sound pressure is greater than the required level of the sound pressure level, the step of reducing the impeller speed and increasing the minimum pitch angle may be repeated, and the level of the sound pressure at the noise-influencing site may be measured again, until the level of the sound pressure is less than or equal to the required level of the sound pressure.

In addition, in a case that there are other noise-influencing sites in the range of the determined noise-influencing sector, the impeller speed may be adjusted and/or the minimum pitch angle may be increased, so that the measured level of the sound pressure is not greater than the required level of the sound pressure at a noise-influencing site with the minimum required level of the sound pressure, or the level of the sound pressure is not greater than the required level of the sound pressure at a noise-influencing site closest to the turbine.

In some embodiments, that the output power is increased may include a following step. The wind turbine is operated in a power-boosted mode for power compensation.

In a case that the wind turbine operates in the power-boosted mode, the impeller speed and/or the minimum pitch angle of the wind turbine may be restored to a default value, and torque of a generator of the wind turbine is set within a range between a rated value for the torque and a preset value for the torque after the output power of the wind turbine reaches the rated power. The preset value for the torque is greater than the rated value for the torque.

Specifically, the impeller speed and the minimum pitch angle may be firstly reset from a current value to the default value. The default value may refer to values of the impeller speed value and the minimum pitch angle of the turbine during normal operation that is prior to performing the method for controlling noise according to the embodiment, namely, a design value of the turbine.

In a case that the output power of the turbine reaches the rated power, since output power of the turbine is directly proportional to the torque of the generator, the torque of the generator may be increased to increase the output power of the turbine, consequently the output power can be above the rated power, so that supernumerary output power can be used to compensate for a loss in power generation during noise control in the corresponding noise-influencing sector. The preset value for the torque may be a value of the torque that enables the turbine to output the maximum power while ensuring safe operation, and the value may be set in advance. For example, based on an amount of the loss in power generation during the turbine operates in the power-limited mode, it may be determined which value in the range between the rated value for the torque and the preset value for the torque is to be set. Those skilled in the art can understand that a manner of compensating the amount of power generation is not limited thereto. For example, the torque of the generator may be set to be any value in the range between the rated value for the torque and the preset value for the torque, or a length of time for operating in the power-boosted mode may be set.

In some embodiments, the requirement on noise control may further include a length of time for operating in the power-limited mode and/or a time period for controlling noise. The time period for controlling noise refers to a time period in which the aerodynamic noise of the wind turbine is required to be controlled. For example, in a case that the requirement on noise control includes the time period for controlling noise, the output power of the wind turbine may be limited during the time period for controlling noise, until the time period for controlling noise ends. The step of limiting the output power may be similar to the step S40 in FIG. 1. For example, the time period for controlling noise may be a time period from 21 p.m. to next 6 a.m., but is not limited thereto.

Figure 3:
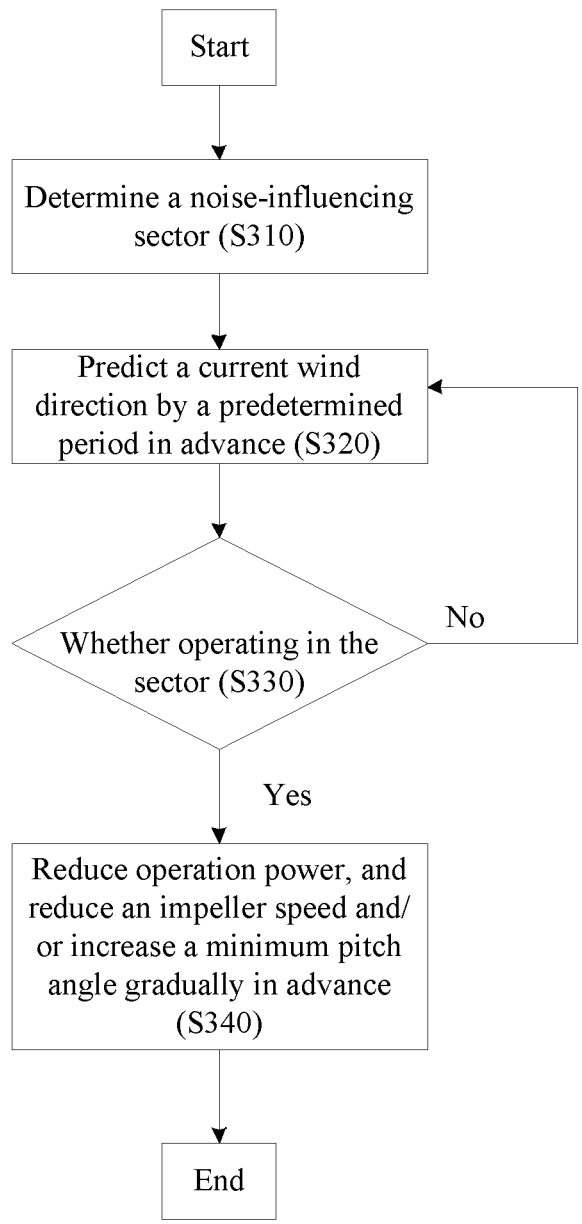
FIG. 3 is a flowchart of a method for controlling noise of a wind turbine according to another embodiment of the present disclosure.

FIG. 3 is a flowchart of a method for controlling noise of a wind turbine according to another embodiment of the present disclosure.

Reference is made to FIG. 3. According to another embodiment, step S310 is similar to step S10 of FIG. 1, and the noise-influencing sector of the wind turbine may be determined based on the position of the wind turbine and the position of the noise-influencing site.

In step S320, the current wind direction may be predicted by a predetermined period in advance. For example, a prediction model may be established in advance by using history data, and the determined prediction model may be used to predict the current wind direction by a predetermined period (such as 5 minutes, 10 minutes, or 60 minutes) in advance.

Then, the step S330 is similar to the step S30 in FIG. 1. It may be determined in advance whether the wind turbine under the predicted wind direction would operate in the noise-influencing sector.

In a case that it is determined that the turbine operates in the noise-influencing sector, output power of the wind turbine may be limited in step S340. In case of operating in the power-limited mode, an impeller speed is gradually decreased in advance and/or a minimum pitch angle is gradually increased in advance within the predetermined period. Thereby, the measured level of the sound pressure at the noise-influencing site is less than or equal to the required level of the sound pressure level, at a current time when the predetermined period ends.

In addition, the output power of the wind turbine may further be increased after reaching a rated power. In case of operating in the power-boosted mode, the impeller speed and/or the minimum pitch angle may be gradually restored in advance within the predetermined period. Thereby, the impeller speed and the minimum pitch angel are default values, at the current time when the predetermined period ends.

It can be seen that smooth switching between the power-limited operation and the power-boosted operation of the turbine can be realized. Instability due to an instant sudden switching can be prevented, and safe operation of the turbine can be further guaranteed.

In addition, in a case that it is determined in the step S330 that the turbine does not operate in the noise-influencing sector, the method may return to the step S320 to continue predicting the current wind direction.

In addition, the turbine may be set based on a prediction result to operate in one of the power-limited operation mode and the power-boosted operation mode, in a case that the predicted wind directions shows that fluctuations of the wind directions in the future would make the turbine operate unsteadily at a border of the noise-influencing sector (for example, alternating frequently between two conditions of operating and not operating in the noise-influencing sector). Thereby, it is prevented that stability and safety of the turbine are affected by adjusting parameters back and forth within a short period of time.

In addition, it may be determined whether the current time after the predetermined period (such as 5 minutes, 10 minutes, or 60 minutes) would be within the controlling noise time period, in a case that the requirement on noise control includes the time period for controlling noise.

The output power of the wind turbine may be limited, in a case that it is determined that the current time after the predetermined period is within the time period for controlling noise. The step of limiting the output power may be similar to the step S340.

Figure 4:
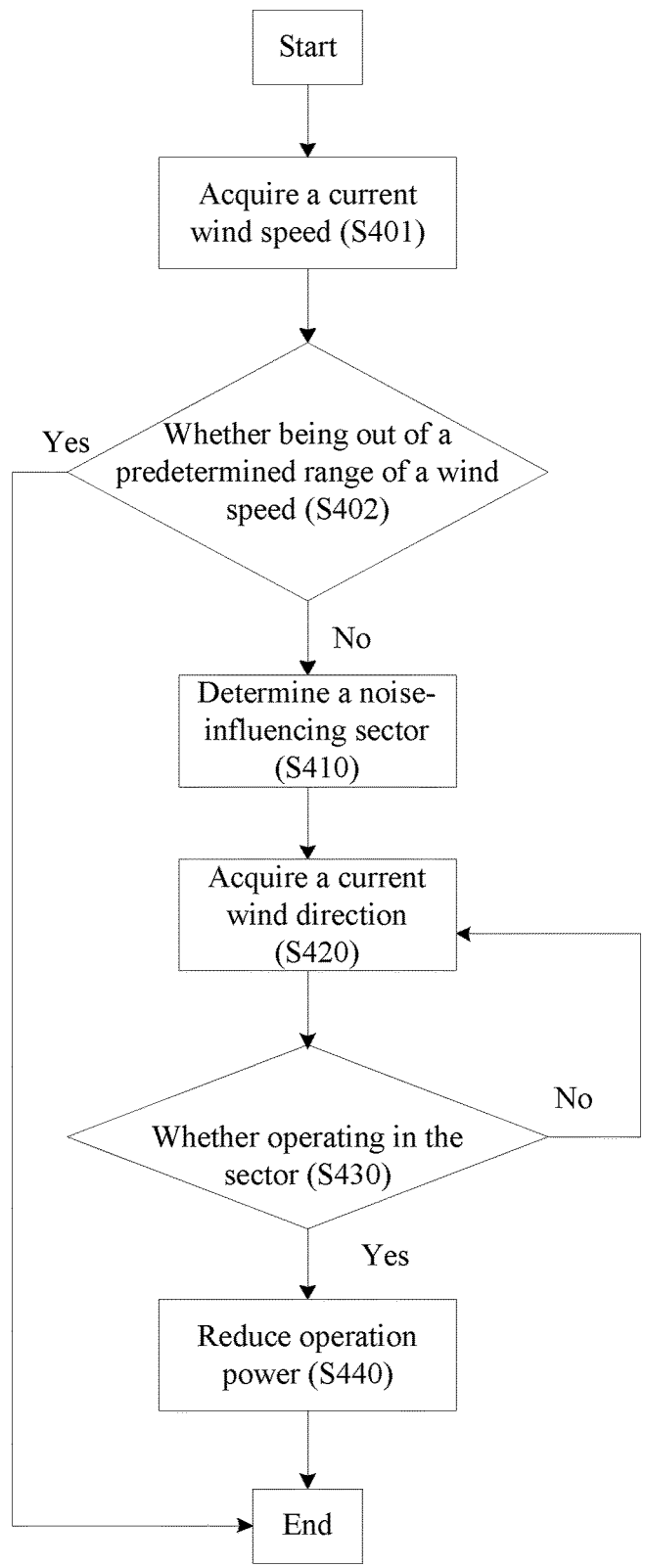
FIG. 4 is a flowchart of a method for controlling noise of a wind turbine according to another embodiment of the present disclosure.

FIG. 4 is a flowchart of a method for controlling noise of a wind turbine according to another embodiment of the present disclosure.

Reference is made to FIG. 4. A current wind speed may be acquired in step S401 before the noise-influencing sector is determined in step S410. Those skilled in the art may appreciate that a variety of conventional methods can be used to acquire the current wind speed.

In step S402, it may be determined whether the acquired current wind speed is out of a predetermined range of a wind speed.

In some embodiments, the predetermined range of the wind speed may be a wind speed range between a first wind speed and a second wind speed. The turbine is in a variable-rotor-speed control stage in a case that the wind speed is less than the first wind speed (for example, 6 m/s). In such case, the impeller speed is low, the generated aerodynamic noise is low, and there is no need to control the noise of the turbine. Environmental noise is generally much larger than the noise generated by the turbine in a case that the wind speed is greater than the second wind speed (for example, 12 m/s), and there is no practical significance in controlling noise of the turbine.

Therefore, the wind turbine may normally operate without performing noise control in a case that it is determined in the step S402 that the current wind speed is out of the predetermined range of the wind speed. Otherwise, the method continues to perform steps S410 to S440. Herein steps S410 to S440 are similar to the steps S10 to S40 in FIG. 1, respectively.

In some embodiments, in the step S401, the predetermined prediction model as described in FIG. 3 may be used to predict the current wind speed by the predetermined period in advance.

It should be noted that no noise control is performed on the wind turbine, in a case that it is determined in the step S402 that the acquired current wind speed is out of the predetermined range of the wind speed. Namely, the wind turbine operates normally and a method for controlling noise is not performed, regardless whether the current time is within the time period for controlling noise and whether the wind turbine operates in the noise-influencing sector.

Figure 5:
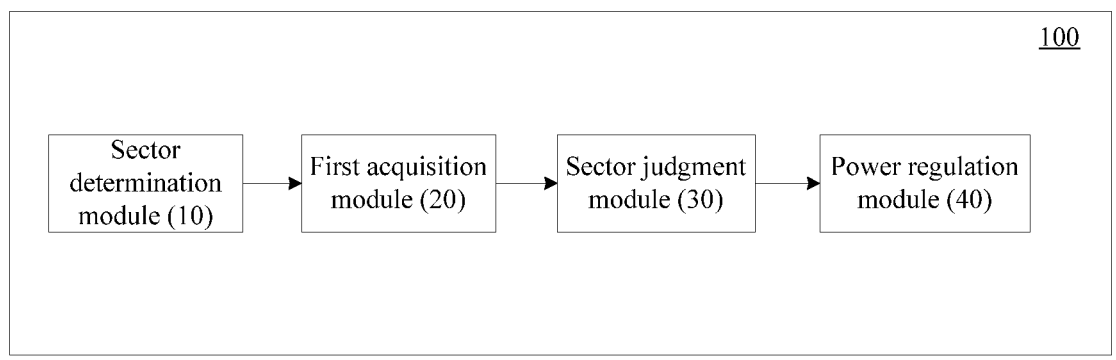
FIG. 5 is a structural block diagram of an apparatus for controlling noise of a wind turbine according to an embodiment of the present disclosure.

FIG. 5 is a structural block diagram of an apparatus for controlling noise of a wind turbine according to an embodiment of the present disclosure.

Reference is made to FIG. 5. The apparatus 100 according to the embodiment may include a sector determination module 10, a first acquisition module 20, a sector judgment module 30, and a power regulation module 40.

The sector determination module 10 may determine a noise-influencing sector of the wind turbine based on a position of the wind turbine and a position of the noise-influencing site.

The noise-influencing site refers to a referential site (for example, a settlement) affected by the noise of the wind turbine. The noise-influencing sector may be a sector region. A vertex of the sector region is the position of the wind turbine. A central angle of the sector region has a predetermined angle, and is formed with an angular bisector in a direction from the wind turbine to the noise-influencing site.

The first acquisition module 20 may acquire a current wind direction.

In some embodiments, the first acquisition module 20 may acquire a referential direction of the turbine via a satellite positioning-and-orientation system installed on the wind turbine, and acquire the current wind direction via the satellite positioning-and-orientation system and a yaw system of the turbine.

For example, the first acquisition module 20 may acquire the referential direction (such as due north) of the turbine via the satellite positioning-and-orientation system, and acquire the current wind direction via the yaw system of the turbine based on the acquired referential direction.

The sector judgment module 30 may determine whether the wind turbine under the current wind direction operates in the noise-influencing sector. For example, the sector judgment module 30 may determine whether a downwind region of the turbine is included in the noise-influencing sector under the current wind direction.

In a case that the sector judgment module 30 determines that the wind turbine operates in the noise-influencing sector, the power regulation module 40 may limit the output power of the wind turbine. After the wind turbine operates goes out from the noise-influencing sector (namely, the downwind region of the turbine is not included in the noise-influencing sector), the power regulation module 40 may increase the output power after the output power of the wind turbine reaches a rated power.

In a case that the sector judgment module 30 determines that the wind turbine does not operate in the noise-influencing sector, the first acquisition module 20 may continue acquiring the current wind direction.

In some embodiments, limiting the output power may include following steps. A requirement on noise control at the noise-influencing site is acquired, and the requirement on noise control includes a level of a sound pressure at the noise-influencing site. The wind turbine is operated in a power-limited mode corresponding to the requirement on noise control, so as to control the noise.

In some embodiments, the power regulation module 40 may reduce an impeller speed and/or increase a minimum pitch angle of the wind turbine, in a case that the wind turbine operates in the power-limited mode, so that a measured level of the sound pressure is less than or equal to a required level of the sound pressure at the noise-influencing site. A specific description of limiting the output power has been provided in the above description and is not repeated herein.

In some embodiments, increasing the output power may include a following step. The wind turbine is operated in a power-boosted mode for power compensation.

The power regulation module may restore the impeller speed and/or the minimum pitch angle of the wind turbine to a default value, and set torque of a generator of the wind turbine within a range between a rated value for the torque and a preset value for the torque after the output power of the wind turbine reaches the rated power, in a case that the wind turbine operates in the power-boosted mode. The preset value for the torque is greater than the rated value for the torque. A specific description of increasing the output power has been provided in the above description and is not repeated herein.

The requirement on noise control may further include a length of time for operating in the power-limited mode and/or a time period for controlling noise.

In some embodiments, the step of acquiring the current wind direction by the first acquisition module 20 may include a following step. The current wind direction is predicted by a predetermined period in advance.

The sector judgment module 30 may determine in advance whether the wind turbine under the predicted wind direction operates in the noise-influencing sector determined by the sector determination module 10.

In a case that it is determined that the turbine operates in the noise-influencing sector, the power regulation module 40 may limit the output power of the wind turbine. In case of operating in the power-limited mode, an impeller speed is gradually decreased in advance and/or a minimum pitch angle is gradually increased in advance within the predetermined period. Thereby, the measured level of the sound pressure at the noise-influencing site is less than or equal to the required level of the sound pressure level, at a current time when the predetermined period ends.

The power regulation module 40 may increase the output power of the wind turbine after reaching the rated power. In case of operating in the power-boosted mode, the impeller speed and/or the minimum pitch angle may be gradually restored in advance within the predetermined period. Thereby, the impeller speed and the minimum pitch angel are default values, at the current time when the predetermined period ends.

It can be seen that smooth switching between the power-limited operation and the power-boosted operation of the turbine can be realized. Instability due to an instant sudden switching can be prevented, and safe operation of the turbine can be further guaranteed.

In addition, the first acquisition module 20 may continue acquiring (predicting) the current wind direction, in a case that the wind turbine does not operate in the noise-influencing sector.

In some embodiments, the apparatus 100 may further include a time period judgment module (not shown in the figure). The time period judgment module may determine whether the current time after the predetermined period (such as 5 minutes, 10 minutes, or 60 minutes) would be within a time period for controlling noise, in a case that the requirement on noise control includes the time period for controlling noise.

For example, the power regulation module 40 limits the output power of the wind turbine until the time period for controlling noise ends, in a case that the time period judgment module determines that the current time after the predetermined period is within the time period for controlling noise.

In some embodiments, the power regulation module 40 may reduce the impeller speed and increase the minimum pitch angle of the wind turbine, so that a level of sound power of the turbine is less than or equal to a required level of sound power in the time period for controlling noise.

In some embodiments, the apparatus 100 may further include a second acquisition module (not shown in the figure) and an operation control module (not shown in the figure). The second acquisition module may acquire a current wind speed before the sector determination module 10 determines the noise-influencing sector. An operation control module may operate the wind turbine normally and the apparatus 100 does not control the noise, in a case that the current wind speed acquired by the second acquisition module is out of a predetermined range of a wind speed.

A control device is further provided according to an embodiment of the present disclosure. For example, the control device may be a main controller of the wind turbine, or other control device that is connected to the wind turbine to control operation of the wind turbine. In some embodiments, the control device may include a processor and a memory. The memory is configured to store a computer program. The computer program when executed by the processor configures the processor to perform the aforementioned method for controlling noise of the wind turbine.

A computer-readable storage medium storing a computer program is further provided according to an embodiment of the present disclosure. The computer-readable storage medium stores a computer program, which when executed by a processor configures the processor to perform the aforementioned method for controlling noise of the wind turbine. The computer-readable storage medium is any data storage apparatus capable of storing data that is read by a computer system. Examples of the computer-readable storage medium include: a read-only memory, a random access memory, a read-only optical disk, a tape, a floppy disk, an optical data storage apparatus, and a carrier (such as data transmission via the internet over a wired or wireless transmission channel).

Based on the method and the apparatus for controlling noise of the wind turbine according to the embodiments of the present disclosure, an operation mode of the wind turbine can be reasonably switched by delimiting the noise-influencing sector of the wind turbine. The wind turbine is controlled to meet a restraint on the noise while compensating a loss in power generation due to the noise control. Thereby, benefits of wind farms are improved, and requirements on various customizations are met.

Although the present disclosure has been shown and described in detail with reference to the exemplary embodiments of the present disclosure, those skilled in the art should understand that the present disclosure can be modified in forms and details without departing from the spirit and scope of the present disclosure as defined by the claim.

The invention claimed is:

1. A method for controlling noise of a wind turbine, comprising:
   acquiring a current wind speed and determining that the current wind speed is within a predetermined range of wind speed;
   acquiring a current wind direction;
   determining whether a downwind region of the wind turbine under the current wind direction is included in a noise-influencing sector;
   limiting output power of the wind turbine in response to determining that the downwind region of the wind turbine under the current wind direction is included in the noise-influencing sector; and
   continuing to acquire the current wind direction and increasing the output power after the downwind region of the wind turbine under the current wind direction is not included in the noise-influencing sector, and continue increasing, after the output power reaches a rated power, the output power;
   wherein the noise-influenced site is a referential site affected by noise of a plurality of wind turbines; and
   wherein the noise-influencing sector is a sector region, a vertex of the sector region is the position of the wind turbine, and a central angle of the sector region has a predetermined angle, and an angular bisector of the central angle is in a direction from the wind turbine to the noise-influenced site.

2. The method according to claim 1, wherein limiting the output power comprises:
acquiring a requirement on noise control at the noise-influenced site, wherein the requirement on noise control comprises a level of a sound pressure at the noise-influenced site; and
operating the wind turbine in a power-limited mode corresponding to the requirement on noise control, so as to the control the noise.

3. The method according to claim 2, wherein the requirement on noise control further comprises a length of time for operating in the power-limited mode and/or a time period for controlling noise.

4. The method according to claim 2, wherein an impeller speed of the wind turbine is reduced and/or a minimum pitch angle is increased in a case that the wind turbine operates in the power-limited mode, so that a measured level of the sound pressure at the noise-influenced site is less than or equal to a required level of the sound pressure at the noise-influenced site.

5. The method according to claim 4, wherein increasing the output power comprises:
operating the wind turbine in a power-boosted mode for power compensation.

6. The method according to claim 5, wherein:
the impeller speed and/or the minimum pitch angle of the wind turbine is restored to a default value, and torque of a generator of the wind turbine is set within a range between a rated value for the torque and a preset value for the torque after the output power of the wind turbine reaches the rated power, in a case that the wind turbine operates in the power-boosted mode; and
the preset value for the torque is greater than the rated value for the torque.

7. The method according to claim 4, wherein acquiring the current wind direction comprises:
predicting a further time when the downwind region of the wind turbine under the current wind direction is included in the noise-influencing sector; and
adjusting the impeller speed gradually over a predetermined period ending at the further time such that the measured level of the sound pressure at the noise-influenced site is less than or equal to the required level of the sound pressure level at the noise-influenced site.

8. The method according to claim 1, further comprising:
operating the wind turbine normally without controlling the noise, in a case that the current wind speed is out of a predetermined range of a wind speed.

9. A non-transitory computer-readable storage medium, storing a computer program, wherein:
the computer program when executed by the processor performs the method for controlling noise of the wind turbine according to claim 1.

10. An apparatus for controlling noise of a wind turbine, comprising:
a processor; and
a memory storing instructions, wherein the instructions when executed by the processor configure the apparatus to;
acquiring a current wind speed and determining that the current wind speed is within a predetermined range of wind speed;
acquire a current wind direction;
determine whether a downwind region of the wind turbine under the current wind direction is included in a noise-influencing sector; and
limit output power of the wind turbine in response to determining that the downwind region of the wind turbine under the current wind direction is included in the noise-influencing sector; and
continuing to acquire the current wind direction and increasing the output power after the downwind region of the wind turbine under the current wind direction is not included in the noise-influencing sector, and continue increasing, after the output power reaches a rated power, the output power;
wherein the noise-influenced site is a referential site affected by noise of a plurality of wind turbines; and
wherein the noise-influencing sector is a sector region, a vertex of the sector region is the position of the wind turbine, and a central angle of the sector region has a predetermined angle, and an angular bisector of the central angle is in a direction from the wind turbine to the noise-influenced site.

11. The apparatus according to claim 10, wherein the instructions when executed by the processor further configure the apparatus to:
acquire a requirement on noise control at the noise-influenced site, wherein the requirement on noise control comprises a level of a sound pressure at the noise-influenced site; and
operate the wind turbine in a power-limited mode corresponding to the requirement on noise control, so as to control the noise.

12. The apparatus according to claim 11, wherein the requirement on noise control further comprises a length of time for operating in the power-limited mode and/or a time period for controlling noise.

13. The apparatus according to claim 11, wherein an impeller speed of the wind turbine is reduced and/or a minimum pitch angle is increased in a case that the wind turbine operates in the power-limited mode, so that a measured level of the sound pressure at the noise-influenced site is less than or equal to a required level of the sound pressure at the noise-influenced site.

14. The apparatus according to claim 13, wherein the instructions when executed by the processor further configure the apparatus to:
operating the wind turbine in a power-boosted mode for power compensation.

15. The apparatus according to claim 14, wherein:
the impeller speed and/or the minimum pitch angle of the wind turbine is restored to a default value, and torque of a generator of the wind turbine is set within a range between a rated value for the torque and a preset value for the torque after the output power of the wind turbine reaches the rated power, in a case that the wind turbine operates in the power-boosted mode; and
the preset value for the torque is greater than the rated value for the torque.

16. The apparatus according to claim 13, wherein the instructions when executed by the processor further configure the apparatus to:
predict a further time when the downwind region of the wind turbine under the current wind direction is included in the noise-influencing sector; and
adjusting the impeller speed gradually over a predetermined period ending at the further time such that the measured level of the sound pressure at the noise-influenced site is less than or equal to the required level of the sound pressure level at the noise-influenced site.

17. The apparatus according to claim 10, wherein the instructions when executed by the processor further configure the apparatus to:
 operate the wind turbine normally without controlling the noise, in a case that the current wind speed is out of a predetermined range of a wind speed.

18. The method according to claim 6, wherein acquiring the current wind direction comprises:
 predicting a further time when the downwind region of the wind turbine under the current wind direction is not included in the noise-influencing sector; and
 adjusting the impeller speed and/or the minimum pitch angle gradually over a predetermined period ending at the further time such that the impeller speed and the minimum pitch angle are default values.

* * * * *